United States Patent [19]

Tulpule et al.

[11] Patent Number: 4,727,549
[45] Date of Patent: Feb. 23, 1988

[54] WATCHDOG ACTIVITY MONITOR (WAM) FOR USE WTH HIGH COVERAGE PROCESSOR SELF-TEST

[75] Inventors: Bhalchandra R. Tulpule, Vernon; Richard W. Crosset, III, Simsbury; Richard E. Versailles, New Hartford, all of Conn.

[73] Assignee: United Technologies Corporation, Hartford, Conn.

[21] Appl. No.: 758,251

[22] Filed: Sep. 13, 1985

[51] Int. Cl.⁴ .............................................. G06F 11/00
[52] U.S. Cl. ......................................... 371/62; 371/25
[58] Field of Search ............................ 371/15, 25, 62; 324/73 R, 73 AT, 73 PC

[56] References Cited

U.S. PATENT DOCUMENTS

| | | | |
|---|---|---|---|
| 3,749,897 | 7/1973 | Hirvela | 371/62 X |
| 3,919,637 | 11/1975 | Earp | 371/25 |
| 4,161,276 | 7/1979 | Sacher et al. | 371/25 |
| 4,176,780 | 12/1979 | Sacher et al. | 371/25 |
| 4,392,226 | 7/1983 | Cook | 371/61 |
| 4,410,938 | 10/1983 | Higashiyama | 371/62 X |
| 4,594,685 | 6/1986 | Owens | 371/62 X |
| 4,635,258 | 1/1987 | Salowe | 371/62 X |

OTHER PUBLICATIONS

J. P. Hayes, Transition Count Testing of Combinational Logic Circuits, *IEEE Trans. on Computers*, vol. C-25, No. 6, Jun. 1976, pp. 613-620.

*Primary Examiner*—Charles E. Atkinson
*Attorney, Agent, or Firm*—Francis J. Maguire, Jr.

[57] ABSTRACT

A high fault coverage, instruction modeled self-test for a signal processor in a user environment is disclosed. The self-test executes a sequence of sub-tests and issues a state transition signal upon the execution of each sub-test. The self-test may be combined with a watchdog activity monitor (WAM) which provides a test-failure signal in the presence of a counted number of state transitions not agreeing with an expected number. An independent measure of time may be provided in the WAM to increase fault coverage by checking the processor's clock. Additionally, redundant processor systems are protected from inadvertent unsevering of a severed processor using a unique unsever arming technique and apparatus.

13 Claims, 8 Drawing Figures

WATCHDOG ACTIVITY MONITOR (WAM) FOR USE WITH HIGH COVERAGE PROCESSOR SELF-TEST

The invention described herein was made in the performance of work under NASA Contract No. NAS2-11771 and is subject to the provisions of Section 305 of the National Aeronautics and Space Act of 1958 (72 Stat. 435; 42 U.S.C. 2457).

TECHNICAL FIELD

This invention relates to detecting signal processor faults in a user environment with a high degree of fault coverage and to predicting that fault coverage.

BACKGROUND ART

In many digital computer systems the detection and correct isolation or "coverage" of failures in the computer is a matter of great concern. This is particularly true in avionic type computer systems such as flight, engine, navigation or weapon control systems where redundant control systems exist and the correct isolation of a fault must be guaranteed with a high probability without regard to the source of failure. Upon detection of a fault one of the redundant systems is immediately selected to "carry" the system. A variety of Built-In-Test (BIT) techniques have been developed to meet such requirements. Notable among these are the Watchdog Timer (WDT) function and processor self-tests.

The WDT function, also known as "ticket punch" or "sanity monitor" is used to monitor correct software operation by requiring periodic updating or resetting of the WDT hardware within a legal time interval known as a window. This WDT function is a "non-specific" monitor which can detect any selected failure that can cause the program to diverge from its correct execution sequence and thereby miss the WDT update window. The particular implementation of a WDT function can sometimes erode its coverage capability. For example, if the WDT window is too large and the WDT can be updated more than one time within the window, the coverage probability for, say, a program looping failure is thereby reduced.

The processor self-test, unlike the WDT, is a very specific test involving a collection of specific "must work" instructions for a given processor. The tests are executed using specific data as inputs and are designed to "exercise" the maximum number of individual gates in the processor. Clearly this is a formidable task even for the simplest microprocessors due to the essentially infinite number of possible machine states. A very large proportion of these must be tested to assure a high degree of coverage.

The coverage provided by processor self-tests is generally very difficult to predict and has been the subject of many studies. See, for example, an article by Thatte, S. M. and J. A. Abraham, "Test Generation for General Microprocessor Architectures," in *IEEE Proc. of* 1979 International Symposium on Fault-Tolerent Computing, Madison, Wisc., IEEE Computer Society, pp. 203–210, June, 1979. There, a graph-theoretic model for microprocessor architecture is presented which permits the treatment of the organization and instruction set as parameters of test generation procedures. Functional level fault models for the register decoding function, and the instruction decoding and control function are developed independent of the details of implementation. Test generation procedures are presented to detect faults in these functions. Their approach is potentially attractive in a user environment because it suggests the avoidance, to some extent, of the normally enormous amount of computation required to generate test sets for the very large number of gates, flip-flops, and interconnections in LSI circuits such as microprocessors.

In the past, when faced with this task, semiconductor and sometimes system manufacturers have resorted to exhaustive testing of each and every machine state and stuck-at fault condition. However, this approach is unsuitable for providing real time, on line, built-in-test (BIT) coverage of avionic computer systems because of the size of the test.

One of the most important drawbacks of these tests is that they lack an independent, external monitor for the execution and correct completion of these self-tests. In the absence of such a monitor function, such as a WDT, there would be no assurance that the self-test was ever started or successfully completed. The monitoring hardware must be independent of the processor so that the use of the processor under test as a monitor would defeat the purpose of the test.

DISCLOSURE OF INVENTION

The object of the present invention is to provide a highly reliable method and apparatus for the on-line, real time, detection and isolation, i.e., "coverage", of internal failures in a digital computer which may be used to guarantee channel shutdown to a very high degree of certainty in the presence of such failures.

According to a first aspect of the present invention, an instruction modeled self-test method is combined with a Watchdog Activity Monitor (WAM) which must be periodically started and then stopped at the precise time that each self-test is completed in order to avoid having the WAM initiate a trip out or cause a channel sever action. During each WAM activity monitoring interval, the CPU under test executes a processor self-test; the CPU issues a sequence of state transition signals after each subtest is completed; the failure to complete the test, as measured by the number of transition signals received, exactly at the end of the interval, as indicated by a reset signal provided by the CPU, results in a guaranteed WAM trip leading to channel sever. The concept of encompassing a comprehensive functional processor self-test with the WAM function to provide a very high and predictable coverage of processor faults is at the center of this invention.

It is essential, in order to understand the central teaching of this first aspect of the present invention, to understand that the timing aspects of the WDTs of the prior art have been abandoned in the WAM of the present invention. The processor self-test is set-up in advance to test the major functional blocks of the signal processor. These may include bit manipulation tests, logical operation tests, addition and subtraction operational tests, divide and multiply operational tests, and rotate and shift operational tests. Of course, a variety of these tests may be excluded and other tests may be included. At the conclusion of each of the above major categories of tests a transition is made to the next major category of tests. At that time, a transition signal is sent into the Watchdog Activity Monitor indicating that one of the major tests has been completed. Of course, transition signals could be sent more frequently, at the conclusion of minor test steps accomplished within each major functional test block. Each time that the WAM receives a transition signal it increases or decreases a count signal magnitude which keeps track of the total number of state transitions which have taken place for each repetition of the periodic test. At the conclusion of each repetition of the test a reset signal is sent by the CPU to the WAM. If the reset signal arrives at the WAM while the count signal magnitude is equal to an expected magnitude then the WAM will have ascertained that a correct number of test executions have taken place and a channel sever signal will not be issued.

In further accord with the first aspect of the present invention, a timer is provided which determines the "health" of the system clock. It must be updated periodically within a window as determined by an independent time reference. This timer is necessary in order to guarantee the reliability of the WAM. It is a loss of clock or loss of software detector.

In accordance with a second aspect of the present invention, a methodology for analytically modeling processor faults and predicting the self-test fault coverage is provided. A finite state Markov modeling technique for the WDT processor self-test function provides a methodology for analytically predicting and evaluating the failure coverage provided by this and any other WAM function.

A number of prior art techniques have been developed for modeling the failures of individual electronic components and predicting their reliability. However, these are clearly unsuitable for digital microprocessors in a user environment due to the large number of gates, flip-flops, and state sequences involved. A state transition modeling approach such as Markov is also inadequate due to data dependencies. The finite state Markov modeling technique for the WAM and self-test method disclosed herein provides a methodology for analytically predicting and evaluating the failure coverage provided by this or any other WAM function.

The Watchdog Activity Monitor and self-test method of the present invention provides an attractive alternative to prior art methods and apparatus for detecting faults in signal processors in a user environment. By marrying a unique self-test method based on the processor subfunctions with a unique Watchdog Activity Monitor, a very high degree of failure coverage is achieved. Furthermore, the use of a second keep-alive "ticket-punch" type timer for guaranteeing the health of the system clock, the present invention further increases its failure coverage.

These and other objects, features and advantages of the present invention will become more apparent in the light of the following detailed description of an exemplary embodiment thereof as illustrated in the accompanying drawing.

BEST MODE FOR CARRYING OUT THE INVENTION

The analytical techniques utilized in the self-test as taught herein, according to the present invention, provides an arbitrarily large, analytically determined coverage of processor faults which can be predicted by using a Markov based fault modeling technique. A typical current state of the art microprocessor contains several thousand gates and many flip-flops many of which are data dependent and/or inaccessible externally. Therefore, under non-controlled conditions the possible states of a processor are essentially infinity. However, when a processor is performing a self-test in close concert with a Watchdog Activity Monitor (WAM) as described herein, the data and timing characteristics are prespecified. Therefore, the processor states consisting of the union of the states of all internal memory devices (flip-flops) and logic gates are fixed and can be uniquely defined. Likewise the transition states of the processor during the WAM self-test are also fixed and can be uniquely defined, at least under no failure conditions.

Figure 1:
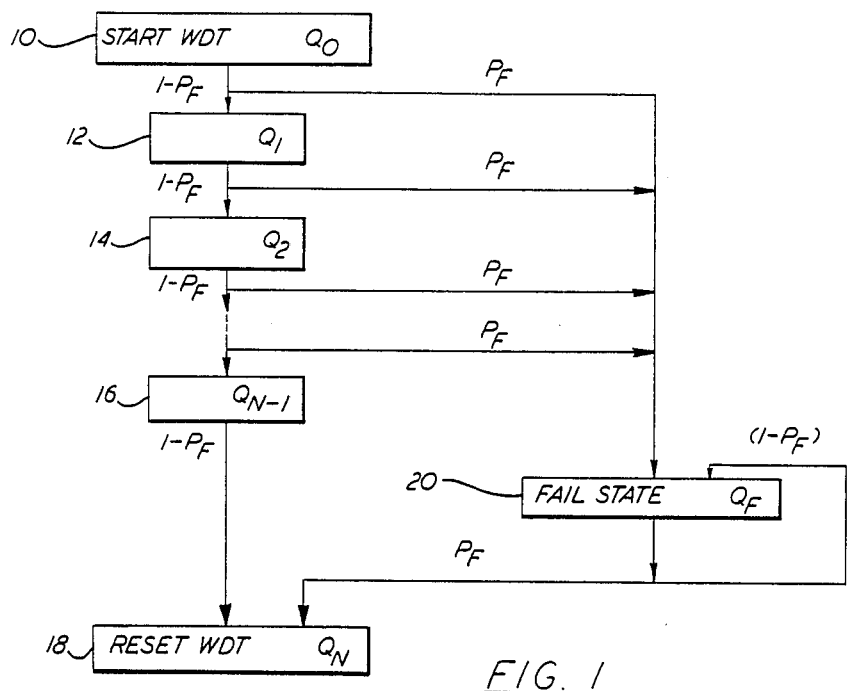
FIG. 1 is a Markov model for fault coverage analysis.

FIG. 1 is an illustration of such a Markov model for analyzing predicted fault coverage in a functional level processor test such as is utilized in a processor using a Watchdog Activity Monitor (WAM), according to the present invention. The test is conceptualized as a chain of test states 10, 12, 14, . . . , 16, 18 ($Q_0, Q_1, Q_2, \ldots, Q_{N-1}, Q_N$). The test starts with an initial state 10 ($Q_0$). As soon as the test is thus initiated, a WAM counting sequence is also begun in which test state transitions are counted. After the test is initiated in step 10, a selected test is next executed in step 12. There is a certain probability $P_F$ that the test initiated in step 10 will not properly sequence to the step 12. In that case a fail state 20 ($Q_F$) is entered. The fail state $Q_F$ is defined to be the collection of states to which the processor transitions under failure conditions. Thus, if a failed processor transitions from one of the expected test states to any out-of-sequence state without going through the correct intermediate state(s) then it is in state $Q_F$. Similarly, if it goes from a test state to some other state not defined in the set of test states it is also considered to have entered $Q_F$.

A series of correct test states 12, 14, 16 are normally executed until the final state 18 ($Q_N$) is reached. After each state transition a count pulse is sent to the WAM. After the final state ($Q_N$) is reached the WAM is sent a reset signal indicating the point in time at which the entire test sequence has been completed. As explained above, if a failure has occurred during the test sequence at some point, a transition will be made from the normal $Q_0$-$Q_N$ sequence into the fail state 20. An out-of-sequence transition from the fail state 20 to the final state $Q_N$ i.e., before or after the complete test sequence has been run in full, will result in a reset signal being sent to the WAM before or after expected i.e., before or after the count reaches the expected count. Since the WAM tolerates a reset signal only when the count is at the expected count, the channel will be severed by the WAM. The best mode embodiment disclosed herein utilizes a counter responsive to the above described count pulses. If the counter counts down to zero before or after expected, a channel sever is initiated. It should of course be understood that many other similar approaches may be taken in implementing the tracking of the state transitions of the self-test.

The state transitions in the Markov diagram of FIG. 1 are probabilistic in nature with the probability of taking incorrect paths denoted by $P_F$, i.e., the probability of a failure. The $P_F$ values are assumed to be the same for all state transitions for the sake of simplification.

In terms of the Markov model, the processor self-test described in this invention can be described as a finite state machine that transitions sequentially from the initial state $Q_0$ through states $Q_1$, $Q_2$, ... to the final state $Q_N$ without any deviation. The associated WAM in this scheme is a counter which counts the correct number of state transitions. More sophisticated counting schemes that distinguish between the various types of transitions, i.e., instruction types, are possible, and are entirely within the scope and intent of the present invention. However, the simplified approach illustrated here is adequate to establish the concepts required to achieve minimum coverage by the WAM as taught herein. In any case, regardless of the counting mechanism used, whenever an incorrect number of state transitions are detected by the WAM at the end of a particular test execution, this leads to channel sever.

The probability of correct failure detection and isolation, i.e., "coverage" (C) can be calculated as follows. The lack of coverage (1-C) can be attributed to those sequences of incorrect state transitions through state $Q_F$ for which the total number of state transitions appears to be correct so that the WAM is unable to detect the failure. As may be seen from FIG. 1, there are many paths for which this is possible. One such sequence is a failure sequence $Q_0$, $Q_1$, $Q_F$, (N-3) $Q_F$, $Q_N$ in which (N-3) $Q_F$ denotes that exactly N-3 transitions from $Q_1$ to state $Q_F$ take place before $Q_N$ is reached with a total of N transitions and the WAM is not tripped. The total probability of the lack of coverage can therefore be given by:

$$1 - C = \sum_{i=1}^{N} P_F^2 (1 - P_F)^{N-2}$$
$$= N \cdot P_F^2 (1 - P_F)^{N-2}.$$

Thus for a processor with $P_F = 10^{-5}$ (10 failures per $10^6$ hours), a 100 state WAM gives a lack of coverage of $$1 - C = 100 \times 10^{-10}(1 - 10^{-5})^{98}$$
$$= 9.99 \times 10^{-10}$$

so that coverage (C) = 0.9999999991 = 0.9$_9$1

Of course it will be understood that the above calculation assumed that every processor failure is detected by the WAM self-test. This is usually not true because of the large number of gates and their possible failure modes. A variety of techniques have been developed in the prior art, the best known of them being the stuck-at gate fault models. The task of simulating stuck-at gate faults to determine the coverage capability of a self-test is extremely difficult because of the extremely large number of possible failure modes of a complex processor. A more powerful technique has been developed by Thatte and Abraham who have modeled the processor architecture in terms of the instructions and registers (see their article referred to in the Background Art section). Their approach deals with failures in instruction or data path execution and is therefore independent of the specific gate level implementation.

Figure 2:
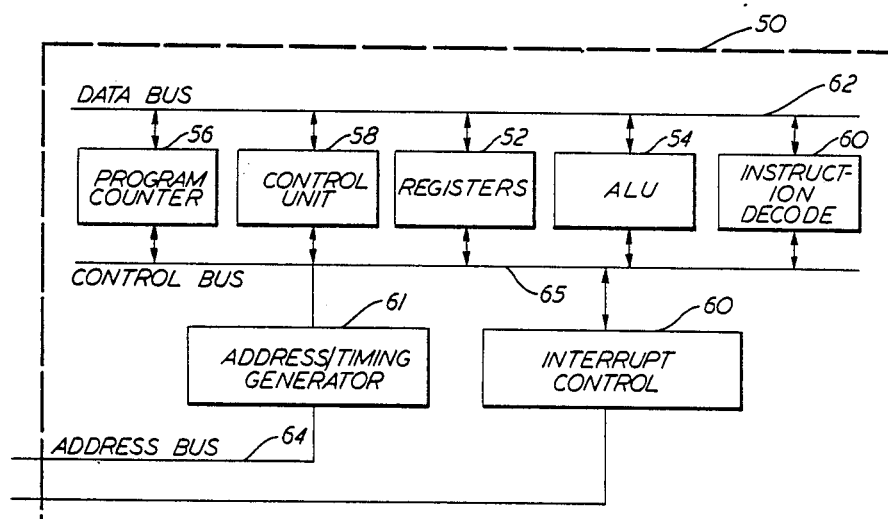
FIG. 2 is a simplified block diagram illustration of a functional model of a signal processor.

The self-test design methodology used in this invention is different from that approach in that it is based on a functional model of the processor such as the model shown in FIG. 2. The modules or elements in the processor are conventional or classical such as registers, arithmetic and logic units, multipliers, rotate and shift units, comparators, instruction decoder, etc., all connected with data and address bus connections for external connection. The method is general enough so that new or unconventional elements can be added to the processor model. In any case, the gate level implementation of these elements is analyzed to determine the apportionment of the processor failure rate. The tests are then developed to exercise each type of instruction and the percentage of failures that can be covered by each test is determined. For example, a shift and rotate unit might be tested by testing right and left shifts for specified logical and arithmetic operands and comparing against expected results. As another example, all gates associated with an adder can be checked by adding one to the largest binary number represented and checking for an overflow with zero as a result. The data input for the tests are chosen to maximize the number of gates that are energized by the test.

The block diagram illustration of FIG. 2 is a functional model of a signal processor 50 including registers 52, ALU 54, program counter 56, control unit 58, interrupt control 60, and address/timing 61 functional blocks. Of course, the typical signal processor will also include other major functional blocks which are not included for the sake of simplicity. Each of the functional block may be conceptualized as communicating with a data bus 62, an address bus 64, and a control bus 65.

Figure 3:
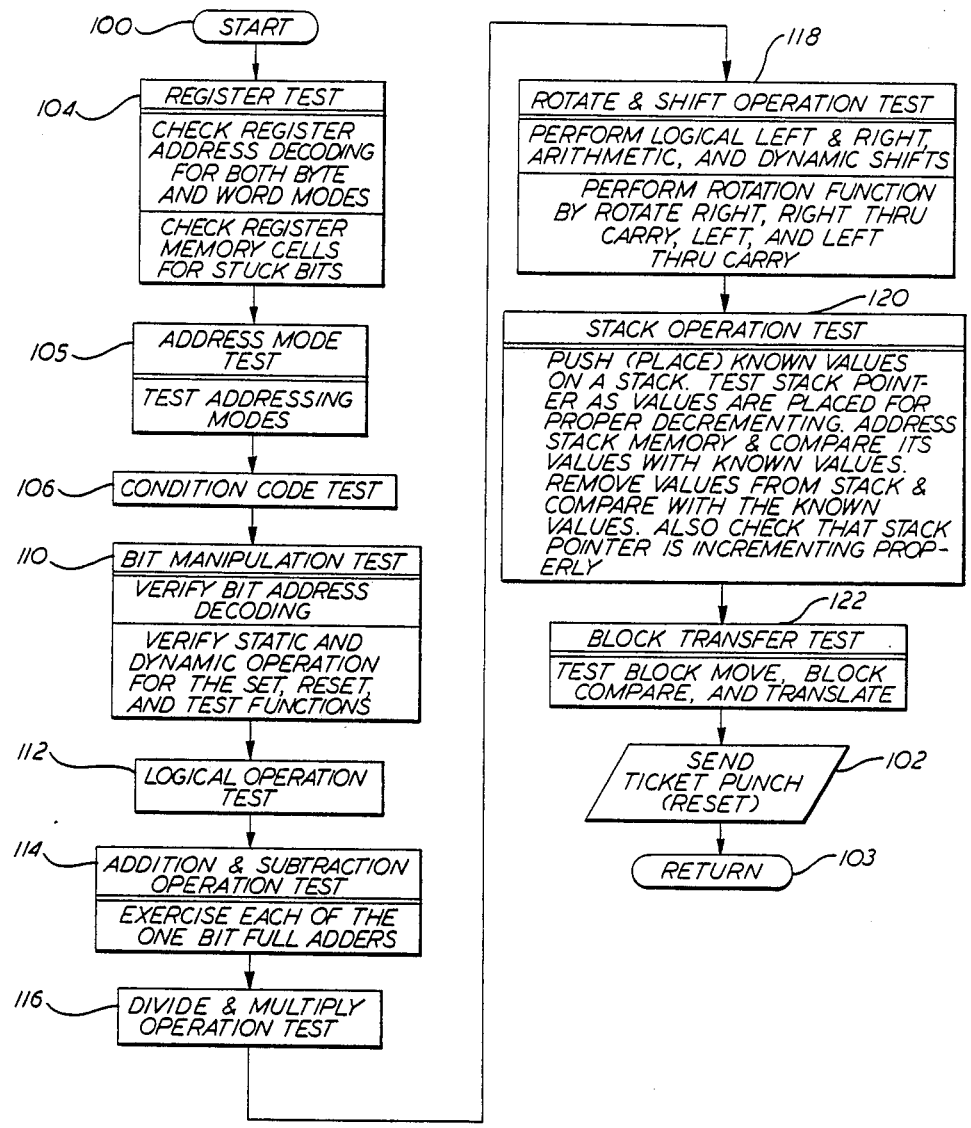
FIG. 3 is an illustration of a comprehensive test procedure which may be carried out on a processor modeled according to the functions shown in FIG. 2.

FIG. 3 is an illustration of a comprehensive test procedure which may be carried out on a processor modeled according to the functions which it is capable of carrying out as, for example, in FIG. 2. Thus, the test procedure illustrated in FIG. 3 is designed for specific use on a typical signal processor. It will therefore be appreciated that the WAM of the present invention is not restricted to use with any particular processor or to a particular test sequence. The processor test sequence described herein is merely illustrative of one of many such tests which may be practiced according to the present invention. The CPU self-test of FIG. 3 is designed to test the processor for hardware faults using the machine instruction set. Each test checks a specific microprocessor function with the assumption that all other functions of the processor are working and are tested elsewhere. The union of the fault coverage of all the tests approaches 100% coverage.

The CPU self-test is performed periodically in order to provide a ticket-punch signal to a Watchdog Activity Monitor (WAM) each time the series of tests is successfully executed. The WAM hardware will be described in detail later; but first, a summary outline of a typical set of functional tests performed is given immediately below.

The self-test begins in a start step 100. During the execution of each test the processor activity signals are monitored by the WAM to count up or down the number of steps executed. At the end of the sequence a ticket-punch or reset is sent, as indicated in a step 102, to the WAM hardware. If the WAM hardware does not receive the ticket-punch signal precisely when the count reaches a selected total count or count-down, a channel sever is immediately executed by the WAM hardware. After successful execution the above test procedure may then be reexecuted periodically after returning in a step 103 and starting again at step 100.

Of course, it should be understood that the particular restrictions of a particular Watchdog Activity Monitor implementation may not allow running the full CPU self-test in the time frame available. The test may then be segmented into modules and/or different sequences, each of which must meet certain restrictions dictated by the particular implementation, i.e., the number of activity signals within a particular real time frame.

Each of the tests described below is designed to energize a small subset of instructions using prespecified data chosen to energize the maximum number of flip-flops, gates, etc., involved in the execution of each particular instruction. The test results are compared with expected results and the next instruction test started on the successful completion of the previous test. However, if the test is not successful as indicated by the comparison, a branch to step 102 is made for sending an (early) ticket-punch signal to the WAM. This action being earlier than expected, trips the external WAM and leads to a channel sever.

After starting the self-test, the processor performs a register test in step 104. The purpose of this test is to verify register address decoding for both bit and word modes. In addition, the register memory cells are checked for stuck bits.

Assuming that a 16 register processor is being tested, word mode decoding can be tested first by loading the word registers R0 to R15, in order, with predefined values. Then each register is read and its contents verified against the predefined number. If all values are correct, R15 to R0 are loaded, in order, with the complement of these numbers. Each register is then read and its contents verified against the complement.

For a bit mode test, only a single bit register pair is tested for bit mode operation. The high bit is loaded with a known value and the low bit is loaded with another known value. Both the high and low bits are then read and verified.

An address mode decoding and function test is next executed in a step 105. A typical modern processor provides many addressing modes such as register, immediate, indirect, direct, index, relative, base, and base index modes. A stored value is read using each addressing mode. The value read is verified against a prespecified value.

Condition codes are used in many instructions in today'processors. These instructions include conditional jumps, return from subroutine, and block/string manipulation instructions. It can be shown that both condition code decoding and function can be tested in a step 106 by selecting only a subset of combinations for each condition code.

A bit manipulation test is next executed in a step 110 where the bit address decoding and static and dynamic operation of the set, reset and test functions are verified.

Bit address decoding may be tested by first setting a register to all zeroes. Next the set instruction is used to change a bit to one. The register contents are then compared to a value the whole register should have with that single bit set. This test may be performed on every bit in the register. For practical reasons the register value can be changed to a new value using a shift operation. Various static and dynamic test, reset, and set functions may next be performed.

A set of logical operational tests may next be performed in a step 112 in which the decoding and correct functioning of the logical operations ADD, OR, XOR, and COMPLIMENT may be verified. The logical tests may be implemented using input from known stored values and the result of each test compared with the stored known values.

Addition and subtraction operational tests may next be performed in a step 114. The addition operation may be verified by exercising each of the one bit full adders. At the completion of each selected test the sum and the flags may be checked against known stored values. The tests may include verification of addition without input carry with the assumption that the addition function is correctly working.

Verification of subtraction without carry with the assumption that the addition function is correctly working may then be carried out. Another set of tests may be executed at this point to verify subtraction with carry, also with the assumption that the addition function is correctly working. At the completion of each test the result is checked against a known stored value. The negate operation may be verified at this time as well.

The self-test next executes a divide and multiply operation test in a step 116. An assumption is made that the shift operation is correctly working and that the add and subtract operation is correctly working. For most microprocessors special cases can be selected to verify the divide operation. These may include division by zero, and division when the divisor is positive, negative, or in a certain range. Separate tests can be set up for each of the cases. At the completion of each test case, the quotient, the remainder and important flags set may be checked against known values.

Similarly, special cases may be needed to verify the multiplication operation depending on the range of the multiplier. Again, a single test is selected for each of the cases and at the completion of each test case, the product and carry bit is checked.

A rotate and shift operation test is next executed in a step 118. The operation of the shift function may be verified by logical left and right shifts, arithmetic shifts, e.g., a arithmetic shift right, and a logic dynamic shift left. The number of bits shifted depends on the processor. The register to be shifted and the carry are loaded with known values. The operation is then performed and the resultant register value and the carry are compared with known values. The known values are selected to test for stuck bits in the shift function.

The operation of the rotate function may be verified by rotate right and left and rotation right and left through carry. These tests load known values into the register to be rotated and the result is compared with known values that represent the results. The carry flag is tested in the through carry instructions. In addition, tests may be designed to rotate single as well as multiple bits in one instruction.

The self-test next executes, in a step 120, a stack operation available in most processors today. A push operation is used to place known values on a stack. As the values are placed on the stack, the stack pointer is tested to assure it is decremented correctly. The memory of the stack is then addressed and its values compared with the known values. Next the values are removed from the stack using the pop operation. As the values are removed, they are compared with the known values and the stack pointer is tested to assure it is incremented. The number of values used in this test is determined by software memory requirements.

The next step 122 is a block transfer test which may be used to verify the block move function, block compare, and translate and test functions. The block move is tested by copying prestored known values into a table using the auto increment and repeat type of instructions. At the completion of this instruction registers used by the instruction are checked against known values. The values in the table are then compared against the known values stored in the table. The next instruction to be used in this test set is the translate and test instruction. This instruction is given a known string and a known table. The flags, registers and translated bits used by the instruction are then checked against known values.

During and after each of the steps 104–122, the instruction fetch, decode and other signals generated automatically by the processor are monitored by the WAM indicating the completion of a test step. At the completion of all of the above steps 102–122, the self-test next executes the step 102 in which a ticket-punch or reset signal is sent from the signal processor under test to the Watchdog Activity Monitor hardware which is expecting a ticket-punch at the precise time that the activity count reaches an expected value. If not received at this expected moment, the channel is severed by the WAM.

Figure 4:
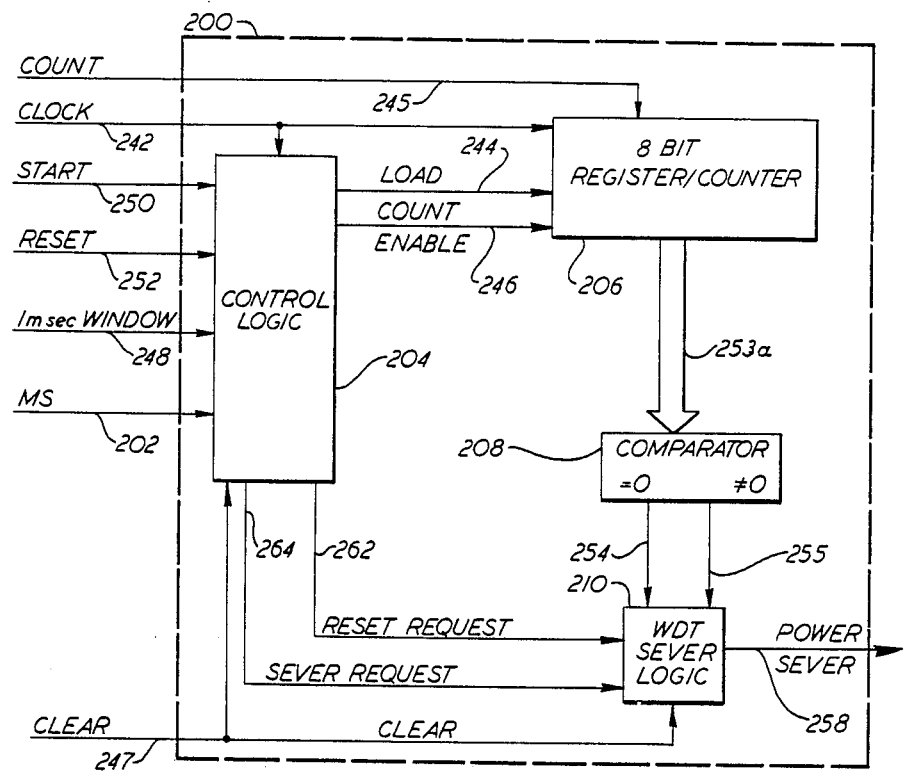
FIG. 4 is a simplified block diagram illustration of a watchdog activity monitor for use with a comprehensive, functionally modeled self-test of a signal processor, according to the present invention.

A fixed interval Watchdog Activity Monitor (WAM) 200 for use with a comprehensive, functionally modeled self-test of a signal processor, according to the present invention, is illustrated in FIG. 4.

The fixed interval Watchdog Activity Monitor (WAM) 200 is initialized by a synchronizing, or Macrosync (MS) signal on a line 202. The Macrosync signal is a periodic signal which is used to frame synchronize the overall system operation. It is shown as a pulse 203 occurring at a time $t_0$ in FIG. 5(a) and recurring a fixed interval of time later at time $t_M$. The WAM 200 comprises a fixed count counter, but the count may be programmable. The WAM includes a control logic section 204, an eight bit register/counter section 206, a comparator 208, and WAM sever logic 210. The particular implementation of the WAM 200 shown in FIG. 4 uses a register/counter 206 for counting count signal pulses and which is preset by a load command signal on a lines 244. The counter is loaded with a total count and counted down to zero by a clock signal on a line 242 which clocks in count signal pulses on a line 245 when enabled by a count enable signal on a line 246. The WAM 200 can be cleared by the processor's CPU to start operation using a CLEAR signal on a line 247.

Figure 5:
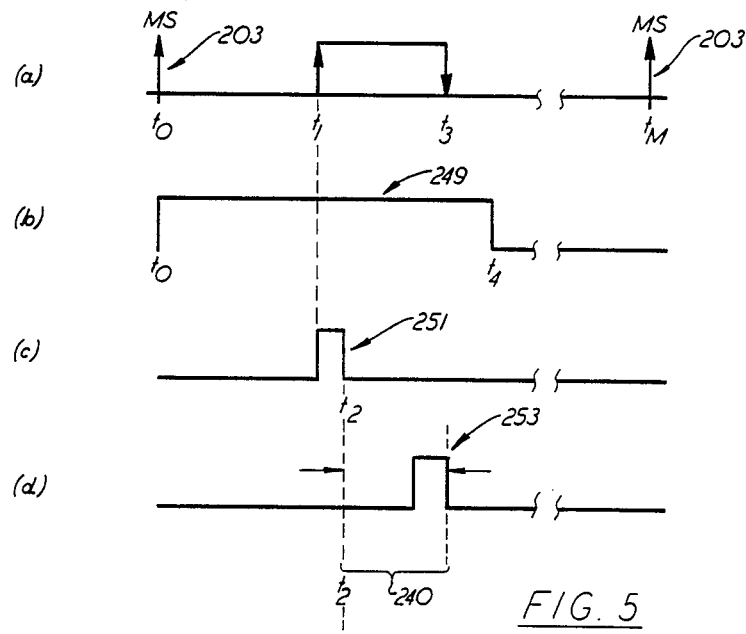
FIG. 5 is a simplified time line diagram showing some of the signal waveforms of FIG. 4 in real time.

Besides being responsive to the Macrosync and CLEAR signals, the control logic 204 is also responsive to a window signal on a line 248 which may be generated by a frequency countdown, and which, when active, indicates the allowable window of real time during which the WAM must be legitimately started and stopped. The window may begin right after the occurrence of the Macrosync signal as shown in FIG. 5(b) by a waveform 249 which shows the window beginning at time $t_0$ and ending at a time $t_4$.

The control logic 204 is also responsive to a START signal on a line 250 which may be a decoded signal generated by software to signify the start of a predetermined period of real time, i.e., the start of the timed WAM self-test sequence occurring in the signal processor. The start signal is shown beginning at time $t_1$ in FIG. 5(c) as indicated by a signal pulse 251 which ends at a time $t_2$.

According to the present invention, the WAM self-test will be performed once per Macrosync period and the test will have a precise duration. Although the precise duration of each test is not specifically monitored or timed, it is effectively measured by the counter since the preplanned duration of each test is known in advance. The test must thus have a precise duration in this sense, that it must take place exactly according to the expected sequence of test state transitions which must have a duration exactly equal to a known duration, albeit only indirectly measured. As described above, it is a comprehensive test designed to exercise the major functional blocks of the processor. In the best mode implementation disclosed herein, the execution of this test is monitored by the WAM function in terms of a precise number of data and instruction fetch operations executed over a precisely known period. However, it should be understood that measures of activity other than those disclosed herein are possible and are entirely consistent with the concepts disclosed herein. In any case, each such measurable activity constitutes a state transition for the processor and is used to count down the counter 206 by means of the COUNT signal on the line 245. At the conclusion of the allotted time, the signal processor's CPU sends a RESET signal on a line 252, also known as a "ticket punch" or "keep-alive" signal, to the WAM 200 as indicated by a signal pulse 253 shown in FIG. 5(d). Since the counter 206 is preset to the total number of measured and predetermined activities in a given self-test, the occurrence of the reset pulse on the line 252 at time $t=t_3$, in the absence of any processor faults, must coincide with the countdown reaching zero in the counter 206. Any other combination of circumstances is indicative of a fault and leads to a power sever request signal on a line 258 as generated by the WAM Sever Logic 210. For example, if the reset pulse on the line 252 occurs before the count has reached zero or is absent when the count reaches zero, the WAM Sever Logic 210 generates a power sever request signal on the line 258.

As explained, the logical implementation of this WAM function may be accomplished by counting occurrences of a specific selected CPU activity on a line 245 in the eight bit register/counter 206 which is driven by the processor clock pulses on the line 242. Upon being initialized by the LOAD signal on the line 244 the counter 206 begins its count of CPU activities after receiving a COUNT enable signal on the line 246. The LOAD signal loads the prespecified count total and may be activated once per Macrosync frame by the WINDOW signal on the line 248 and held valid until the simultaneous occurrence of the START signal on the line 250 and the WINDOW signal on the line 248 at which time it is removed, allowing the counter to count and the count monitor logic to function. If active-high, the counter and monitor logic is held initialized.

Assuming the counter 206 is of the countdown type, it will time out when it reaches zero. The comparator 208 compares the contents of the counter 206 as represented on a line 253a with zero and may provide two signals, namely, equal to zero on line 254 and not equal to zero on line 255. A power sever signal on a line 258 serves to sever the channel in the presence of a failure of the self-test. Thus, if the counter 206 does not exactly countdown to zero at the time the WAM 200 receives a RESET signal on the line 252, a sever signal on the line 258 will be sent and the channel will be severed.

RESET REQUEST and SEVER REQUEST signals on lines 262, 264 are provided by the control logic 204 to the WAM sever logic 210 for the purpose of validating the start and reset request and initiating a sever request from the control logic as a result of detecting incorrect sequences of processor commands to the WAM 200 as described below.

In addition to assisting the WAM sever logic 210 in detecting the time out function described above, the control logic 204 of WAM 200 is also designed to detect the occurrence of any of the following conditions:

(1) More or less than one start and reset command pair in the window;
(2) Any start or reset command after the window;
(3) The start/reset commands out of sequence.

Whenever any one of these conditions above is detected, the control logic 204 generates a sever request on the line 264 which results in a power sever request on the line 258, regardless of the contents of the counter 206. The control logic 204 passes through (i.e., validates) the RESET request signal on the line 252 from the processor to the WAM sever logic on the line 262 only when none of the above conditions are true.

Additional hardware may be added to the WAM, according to the present invention, for testing for a complete loss of the processor clock on the line 242 of FIG. 4. In the case of a complete loss of that clock signal, the processor, as well as the WAM, will be hung-up and an orderly transition to the fail safe condition cannot be achieved. It is therefore desirable to include an independent timing source which, if not periodically serviced, automatically times out.

Figure 6:
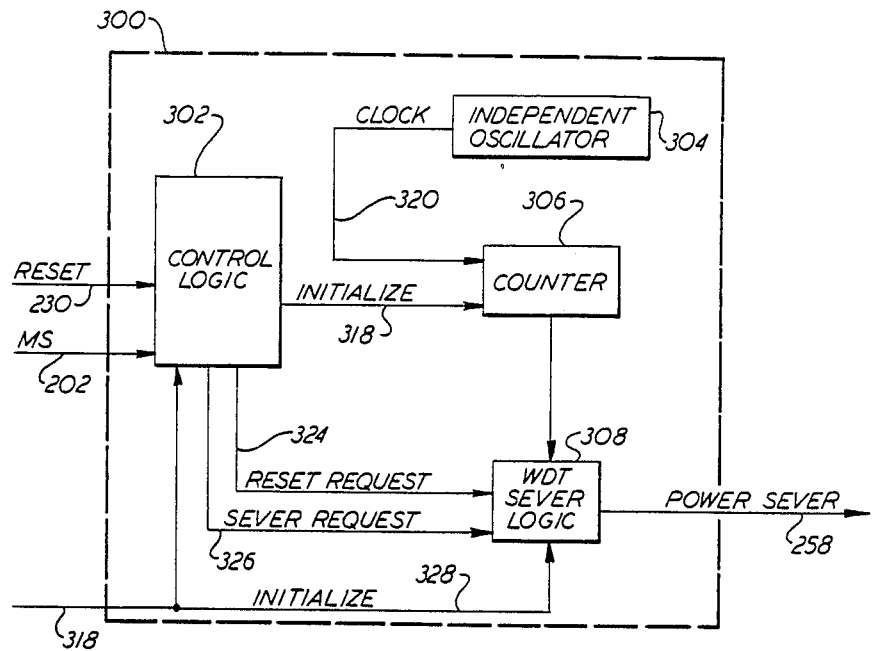
FIG. 6 is a simplified illustration of additional hardware which may be added to the WAM of FIG. 4, according to the present invention, for testing for a loss of the CPU clock.
Figure 7:
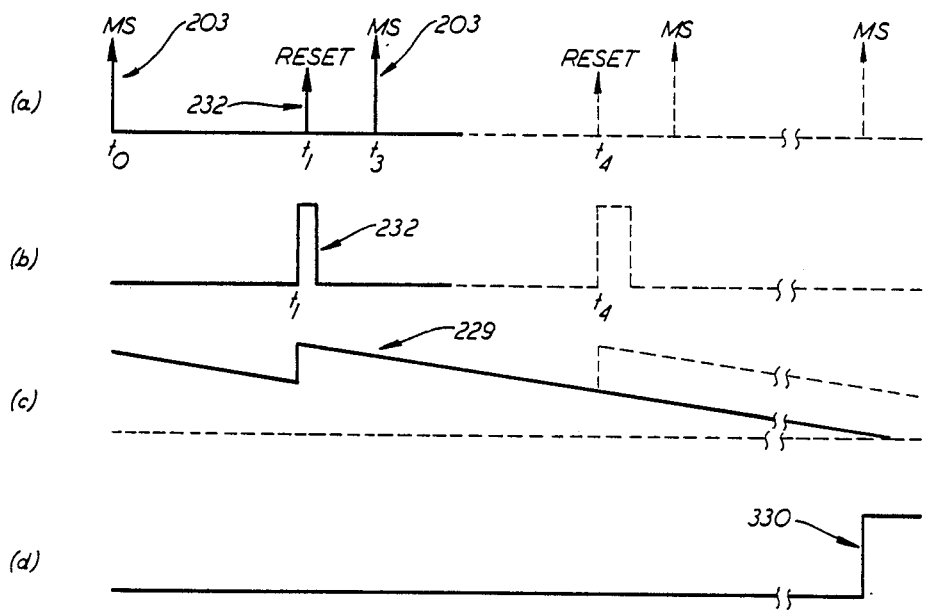
FIG. 7 is a simplified time line type diagram showing some of the signal waveforms of FIG. 6 in real time.

FIG. 6 illustrates additional hardware 300 of this type which may be added to the WAM hardware of FIG. 4. The new hardware includes control logic 302, an independent oscillator 304, a counter 306, and WAM sever logic 308 which may be included within the sever logic 210 of FIG. 4. The control logic 302 is responsive to the Macrosync (MS) signal on the line 202 and the RESET signal on the line 252. These signals are illustrated in FIG. 7(a). There, the Macrosync pulses are illustrated generally by a series of pulses 203 occuring at $t_0$, $t_3$, ... Similarly, the RESET signal on the line 252 is shown in FIG. 7(a) occuring at a time $t_1$ within the Macrosync time frame between $t_0$ and $t_3$. The RESET signal is illustrated generally by the pulse 232.

After receiving a Macrosync signal on the line 202 or a RESET signal on the line 252, the control logic 302 initializes a counter 306 with an INITIALIZE signal on a line 318. This signal serves to initialize the counter which then provides a count-up or count-down to a specific number of clock pulses. The clock signals are provided on a line 320 from the independent oscillator 304. If the counter is not reinitialized before reaching a specific count the WAM sever logic 308 will send a power sever signal on a line 258 which will cause the channel to be severed.

The WAM sever logic 308 is responsive to a RESET REQUEST signal on a line 324, a SEVER REQUEST signal on a line 326, and a time out signal on the line 328. The RESET REQUEST signal informs the sever logic of the occurrence of the first correct RESET signal from the processor after each Macrosync (MS) signal. The SEVER REQUEST signal on the line 326 is used to shutdown the channel in case of multiple RESET requests (between two Macrosync signals) from the CPU on line 230. In case of a complete lack of RESET requests by the CPU, the counter 306 times out and a power sever is requested on line 258 by the WAM sever logic 308. The WDT 300 can be cleared to start operation by an CPU using the INITIALIZE signal on a line 329.

FIG. 7(b) shows the RESET signal 232 of FIG. 7(a) occuring at time $t_1$ and also shows a subsequent point in time $t_4$ at which time a subsequent reset signal should be received but which is not received. The dotted lines indicate the absence of the expected signals at the expected times. Thus, at time $t_4$ a reset signal is expected but does not occur.

If the "counter" of FIG. 6 is implemented as an RC network, the charging and discharging voltage of the necessary capacitor element is shown generally by a ramp waveform 229 in FIG. 7(c) and is indicative of the "time left to sever." Thus, the initialization signal on the line 318 causes the "counter" to be refreshed periodically. In the absence of a reset, the capacitive element is not refreshed and its voltage decays to a value below which the sever logic 308 triggers a power sever signal on the line 258 generally indicated by a waveform 330 in FIG. 7(d).

Figure 8:
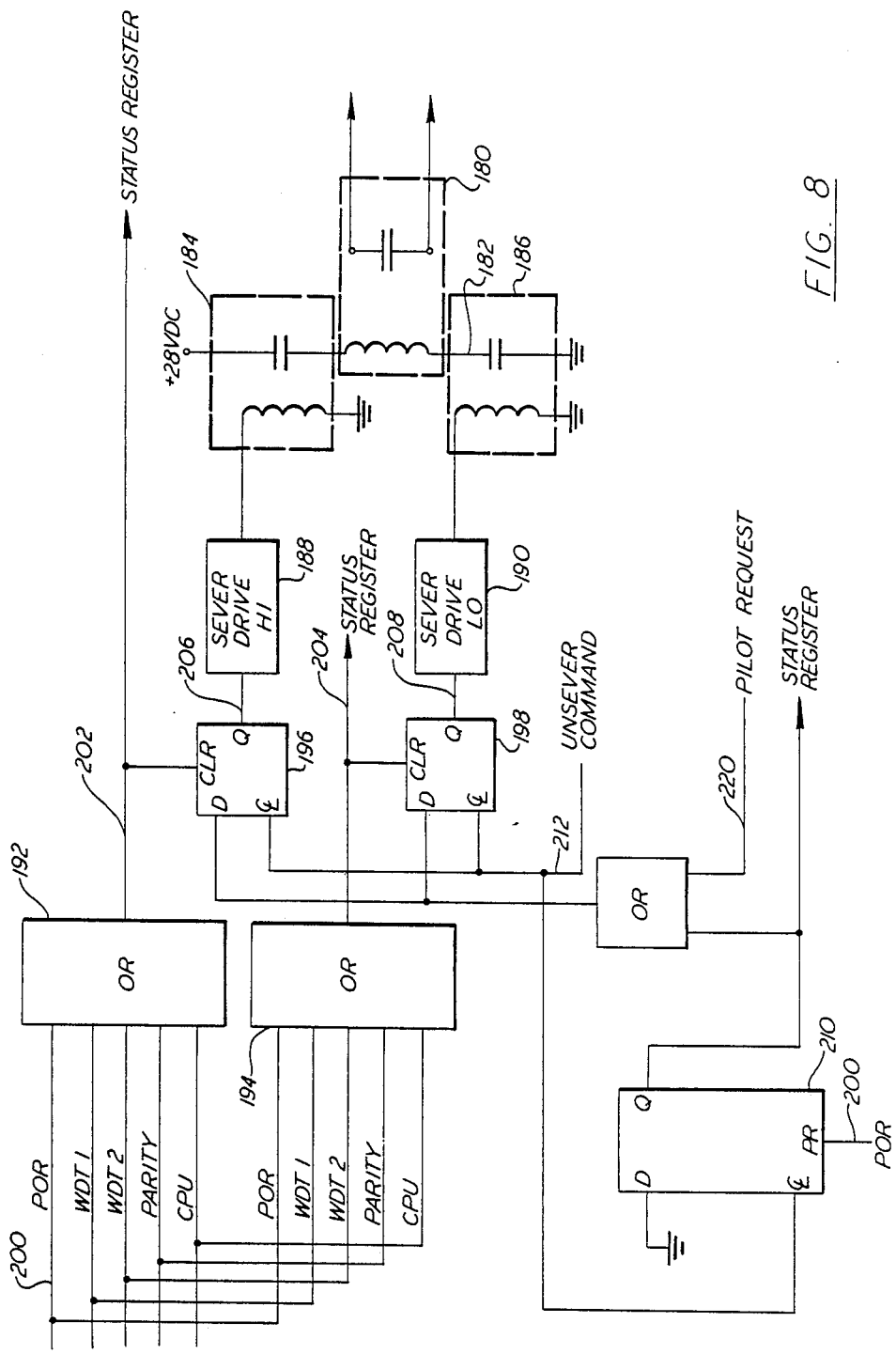
FIG. 8 is a simplified schematic block diagram of sever logic showing the unsever arming logic in particular.

Referring now to FIG. 8, the sever logic may be designed to respond to the power sever requests from the WAM's as well as other sources and actually perform the output disable function. The sever logic shown in FIG. 8 has replicated sever functions for both the sever drive HI and sever drive LO paths for guaranteed fault protection. In other words, the output of the channel under test is controlled by a relay 180 having its coil driven by the power bus. The power supply (e.g., 28 VDC) path 182 is capable of being broken by either one of two relays 184, 186. Each of these relays is driven by a separate sever path which are replications of each other and which include, respectively, a sever drive high unit 188 and a sever drive low unit 190. The sever drive high path also includes a latch 196 and an OR gate 192. Similarly, the sever drive low path includes the latch 198 and an OR gate 194. It should be understood that the replicative function shown for the sever drive circuitry shown is used to assure that a fail-safe channel shutdown can be achieved with a high probability of success regardless of the source of the fault. When power is first applied sever latches 196, 198 are cleared by a POR signal on a line 200 and all channel outputs are disabled. This occurs because the POR signal clears the latches 196, 198 resulting in a zero at each of the Q outputs on the lines 206, 208 which causes the respective sever drive units 188, 190 to deenergize, respectively, the relays 184, 186 causing all channel outputs to have no power. The same POR signal is also used to arm an unsever arm latch 210 so that when the CPU issues an unsever command on a line 212, it is able to enable the latches and turn power on to all outputs. However, the same CPU request also clears the unsever arm latch so that, if the processor later issues an unsever command without a POR (power or reset) or pilot request signal on a line 220 being valid (indicating a processor failure such as lost software), that incorrect action itself clears the sever latches and causes a sever. This last feature provides an added degree of enhanced processor fault coverage.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A watchdog activity monitor (WAM) responsive to a power-on-reset signal for providing a start-up sever signal for severing selected signal processor output signals and responsive to a subsequent unsever request signal for providing an unsever signal for unsevering the selected processor output signals, the WAM for use with a signal processor repetitive self-test, the self-test having associated therewith a start signal pulse indicative of the beginning of each self-test, state transition signal pulses provided by the processor during each self-test upon the occurrence of test state transitions, and a reset signal pulse provided by the processor indicative of the conclusion of each self-test, the WAM comprising:
   counter means, responsive during each repetition of the self-test to the start signal pulse from the signal processor and the state transition signal pulses for providing an output signal having a magnitude indicative of the number of state transition signal pulses received after the reception of the start signal pulse; and
   sever logic means, responsive to the reset signal pulse and to said output signal for providing a sever signal for severing the selected signal processor output signals if the magnitude of said output signals is different from a selected magnitude at the time the reset signal pulse is provided.

2. The WAM of claim 1, further comprising:
   independent timing means responsive to selected processor pulses for timing the interval between said selected processor pulses and providing a timing signal indicative of the duration of said interval; and
   means for comparing the magnitude of said timing signal to a selected magnitude and for providing a sever signal for severing the selected signal processor output signals if said timing signal magnitude differs from said selected magnitude.

3. The WAM of claim 1, further comprising further sever logic means, responsive to a first to occur unsever request signal for providing an unsever signal for unsevering the selected output signals of the signal processor and responsive to any subsequent unsever request signals for providing a sever signal for severing the selected output signals of the signal processor.

4. The WAM of claim 1, further comprising further sever logic means responsive to a power-on-reset signal for providing the start-up sever signal for severing the signal processor output on start-up and responsive to the first to occur of any subsequent unsever request signals for providing an unsever signal for unsevering the selected output signals of the signal processor and responsive to any additional unsever request signals for providing a sever signal for severing the selected output signals of the signal processor.

5. A watchdog activity monitor (WAM), responsive to an unsever request signal by providing an unsever signal for unsevering selected output signals of a signal processor, the WAM for use with a signal processor repetitive self-test having associated therewith a number of sub-tests, a clock signal, a repetitive frame synchronizing signal pulse and a self-test window signal for indicating a subframe within each repetitive frame within which subframe a self-test may be executed, a start signal pulse and a reset signal pulse, occurring respectively, at the beginning and end of each self-test, and the processor providing, during the course of each self-test, state transition signal pulses upon the occurrence of transitions between selected sub-test states, the WAM comprising:
   logic means, responsive to the frame synchronizing pulses and the window signals for enabling a self-test sequence within each subframe, said logic means also responsive, during each subframe, to a start signal pulse from the signal processor for providing a load count signal and a count enable signal in response thereto, siad logic means also responsive, during each subframe to a reset signal pulse from the signal processor for providing a reset request signal in response thereto;
   counter means, responsive to said load count signal and to said count enable signal, for respectively loading a count signal magnitude and for enabling the counting of a plurality of state transition signal pulses during each subframe, said counter means also responsive to the state transition signal pulses and the clock signal from the processor for counting upon each simultaneous reception of both a clock signal pulse and an edge of the state transition pulse within a subframe, said counter means providing a counted output signal having a magnitude indicative of the number of state transition signals received during the subframe; and
   means responsive to said reset request signal and to said counted output signal for comparing, at the time said reset request signal is received, the magnitude of said counted output signal to a reference signal having a magnitude indicative of the magnitude of the number of selected sub-test states and for providing a sever signal for severing the selected output signals of the signal processor if said counted output signal magnitude differs from said reference signal magnitude.

6. The WAM of claim 5, wherein said logic means further comprises means for comparing the sequence of received window, start, and reset signals within each repetitive frame to a selected expected sequence and for providing a sever request signal in the presence of a received signal sequence different from the selected expected sequence.

7. The WAM of claim 5, further comprising:
   independent timing means, responsive to selected signal pulses from the processor for measuring a time interval between said selected processor signal pulses and providing an interval signal indicative of the duration of said interval; and
   means for comparing the magnitude of said interval signal to a time reference signal having a magnitude indicative of the duration of each frame and for providing a sever signal for severing the selected signal processor output signals in the presence of said interval signal magnitude differing from said time reference signal magnitude.

8. The WAM of claim 5, further comprising;

sever logic means, responsive to a first to occur unsever request signal for providing an unsever signal for unsevering the selected output signals of the signal processor and responsive to any subsequent unsever signals for providing a sever signal for severing the selected output signals of the signal processor.

9. The WAM of claim 5, further comprising:

sever logic means responsive to a power-on-reset signal for providing a sever signal for severing the selected signal processor output signals on start-up and responsive to the first to occur of any subsequent unsever request signals for providing an unsever signal for unsevering the selected output signals of the signal processor and responsive to any additional unsever request signals occurring after said first to occur unsever request signal for providing a sever signal for severing the selected signal processor output signals.

10. A method of repetitively testing a signal processor which has selected output signals unsevered after start-up in response to an unsever request signal, each test repetition having a start signal associated with the commencement thereof, state transition signals indicative of transitions therein and a reset signal associated with the conclusion thereof, comprising the steps of:

providing, for each test repetition, a start signal from the signal processor for indicating the starting of a sequence of a number of processor sub-tests;

sequentially executing, for each test repetition, a selected number of processor subtests, the processor providing a transition signal indicative of subtest states;

the signal processor providing, for each test repetition, a reset signal indicative of the conclusion of the last of the selected number of subtests;

providing, for each test repetition, in response to said transition signals a count signal having a magnitude indicative of the number of transition signals provided for comparing said count signal magnitude, in response to said reset signal, to a reference signal having a magnitude indicative of said selected number of sub-tests; and providing, for each test reptiition, a sever signal for severing the selected processor output signals in the presence of said count signal magnitude differing from said reference signal magnitude.

11. The method of claim 10, further comprising the steps of:

providing an independent clock signal for providing an independent measure of time;

using said independent clock signal to measure the elapsed time between successive selected signal processor signals occurring within corresponding successive test repetition periods and providing an elapsed time signal having a magnitude indicative of the duration thereof;

comparing the magnitude of said elapsed time signal to a selected signal magnitude indicative of the processor clock period; and providing a sever signal for severing the selected processor output signals in the presence of said elapsed time signal magnitude differing from said selected signal magnitude.

12. The method of claim 10, further comprising the steps of severing the selected output signals of the signal porcessor in the presence of said sever signal.

13. The method of claim 10, further comprising the steps of:

unsevering the selected output signals of the signal processor after start-up in response to a first to occur unsever request signal; and providing a sever signal for severing the selected output signals of the signal processor in response to any unsever request signals occurring subsequent to said first to occur unsever request signal.

* * * * *

UNITED STATES PATENT AND TRADEMARK OFFICE
CERTIFICATE OF CORRECTION

PATENT NO. : 4,727,549
DATED : 2/23/88
INVENTOR(S) : Bhalchandra R. Tulpule et al It is certified that error appears in the above-identified patent and that said Letters Patent is hereby corrected as shown below:

Claim 1, column 13, lines 40-41.   Cancel the second occurrance of "signals" and substitute -- signal --

Claim 4, column 13, line 68.   After "signals" insert -- occurring after said first to occur unsever request signal --

Claim 5, column 14, line 24.   Cancel "siad" and substitute -- said --

Claim 10, column 16, line 8.   Cancel "reptiition" and substitute -- repetition --

Claim 12, column 16, line 31.   Cancel "porcessor" and substitute -- processor --

Signed and Sealed this

Twenty-fourth Day of January, 1989

Attest:

DONALD J. QUIGG

*Attesting Officer*   *Commissioner of Patents and Trademarks*